United States Patent
Hveding et al.

(10) Patent No.: US 11,624,681 B2
(45) Date of Patent: Apr. 11, 2023

(54) OVERCOMING OTDR DEAD ZONES USING A FEW-MODE FIBER

(71) Applicants: Saudi Arabian Oil Company, Dhahran (SA); King Abdullah University of Science and Technology, Thuwal (SA)

(72) Inventors: Frode Hveding, Dhahran (SA); Islam Ashry, Thuwal (SA); Mao Yuan, Thuwal (SA); Boon Siew Ooi, Thuwal (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 16/744,918

(22) Filed: Jan. 16, 2020

(65) Prior Publication Data

US 2021/0223139 A1  Jul. 22, 2021

(51) Int. Cl.
G01M 11/00 (2006.01)

(52) U.S. Cl.
CPC .... G01M 11/3154 (2013.01); G01M 11/3145 (2013.01)

(58) Field of Classification Search
None
See application file for complete search history.

(56) References Cited

U.S. PATENT DOCUMENTS

| | | | |
|---|---|---|---|
| 4,997,277 A * | 3/1991 | Horiguchi | G01M 11/319 356/73.1 |
| 5,382,910 A | 1/1995 | Walsh | |
| 5,390,018 A * | 2/1995 | Fujita | G01M 11/3145 356/73.1 |
| 5,408,310 A | 4/1995 | Furuhashi et al. | |
| 5,442,434 A * | 8/1995 | Liao | G01M 11/3145 356/73.1 |
| 5,754,284 A | 5/1998 | Leblanc et al. | |
| 2003/0128354 A1 * | 7/2003 | Fayer | G01M 11/3163 356/73.1 |

(Continued)

FOREIGN PATENT DOCUMENTS

| WO | WO 2009148824 | 12/2009 |
|---|---|---|
| WO | WO 2016060747 | 4/2016 |

OTHER PUBLICATIONS

Song, Congcong, et al. "Fault detection of few-mode fiber based on high-order mode with high fault detection sensitivity." Optics letters 44.18 (2019): 4487-4490. (Year: 2019).*

(Continued)

*Primary Examiner* — Rufus L Phillips
(74) *Attorney, Agent, or Firm* — Fish & Richardson P.C.

(57) ABSTRACT

Systems and methods include a method for overcoming optical time domain reflectometry (OTDR) dead zone limitations by using a few-mode fiber (FMF). Optical pulses are transmitted by a transmitter of an OTDR system through a mode MUX/DEMUX into an FMF. Light signals directed by the FMF in a backward direction through the mode MUX/DEMUX are received by the OTDR system through N single-mode fiber (SMF) ports corresponding to N modes in the FMF. Light signals from N−1 dead-zone-free SMF ports are collected by the OTDR system. Losses are measured and faults are located in the FMF based at least on the light signals.

17 Claims, 5 Drawing Sheets

(56) References Cited

U.S. PATENT DOCUMENTS

| | | | |
|---|---|---|---|
| 2007/0273961 A1* | 11/2007 | Jaaskelainen | H04B 10/2916 |
| | | | 359/334 |
| 2009/0263069 A1* | 10/2009 | Hartog | G01D 5/35364 |
| | | | 385/12 |
| 2012/0236294 A1* | 9/2012 | Smith | G01M 11/3154 |
| | | | 356/73.1 |
| 2016/0123837 A1* | 5/2016 | Chen | G01M 11/3172 |
| | | | 356/73.1 |
| 2016/0191163 A1 | 6/2016 | Preston et al. | |
| 2018/0136036 A1* | 5/2018 | Galtarossa | G01H 9/004 |
| 2018/0259422 A1 | 9/2018 | Castro et al. | |
| 2019/0081709 A1 | 3/2019 | Weiner | |
| 2019/0226941 A1* | 7/2019 | Maruyama | G01M 11/39 |
| 2020/0056958 A1* | 2/2020 | Hasegawa | G01M 11/088 |

OTHER PUBLICATIONS

PCT International Search Report and Written Opinion in International Appln. No. PCT/US2021/013487, dated Apr. 30, 2021, 15 pages.

Mao et al., "Sensing within the OTDR dead-zone using a two-mode fiber," Optic Letters, Jun. 2020, 45(11): 2969, 4 pages.

\* cited by examiner

OVERCOMING OTDR DEAD ZONES USING A FEW-MODE FIBER

BACKGROUND

The present disclosure applies to testing optical fibers. Optical time domain reflectometry (OTDR) is commonly used as an optoelectronic instrument for characterizing optical fibers. For example, OTDR techniques can be used to measure losses and locate faults along a fiber under test (FUT). However, available commercial OTDR systems typically suffer from the existence of dead zones along the FUT. For example, dead zones can result from intense Fresnel reflection generated by the fiber front facet, fiber end facet, connectors, and other optical components. In a recorded OTDR signal, for example, the dead zone can be several hundred meters long. This can prevent OTDR from providing reliable sensing or diagnostic data within the dead zone.

SUMMARY

The present disclosure describes techniques which can be used for overcoming optical time domain reflectometry (OTDR) dead zone limitations by using a few-mode fibers (FMF). In some implementations, a computer-implemented method includes the following. Optical pulses are transmitted by a transmitter of an OTDR system through a mode MUX/DEMUX into an FMF. Light signals directed by the FMF in a backward direction through the mode MUX/DEMUX are received by the OTDR system through N single-mode fiber (SMF) ports corresponding to N modes in the FMF. Light signals from N−1 dead-zone-free SMF ports are collected by the OTDR system. Losses are measured and faults are located in the FMF based at least on the light signals.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, FMF-based OTDR techniques can solve dead zone problems occurring in typical OTDR systems. For example, solving the dead zone problems can include canceling or overcoming the dead zones. Second, the techniques can provide improved signal-to-noise ratios and can expand the length of sensing areas for leak detection, injection, and production flow allocations. Third, overcoming OTDR dead zone can be done without using a dummy optical fiber before the actual fiber to be diagnosed.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for overcoming optical time domain reflectometry (OTDR) dead zone limitations by using a few-mode fiber (FMF). For example, light can be injected into (and collected from) the FMF using two different spatial modes to obtain dead-zone-free OTDR signals. In some implementations, FMF typically support fewer than 20 modes. However, technology improvements can increase the number of modes that an FMF can support with greater efficiency (for example, greater efficiency than with fewer modes).

In conventional OTDR systems, in order to minimize the impact of the OTDR dead zones during fiber optic testing, a section of long enough optical fiber can be added between the transmitter and the fiber under test (FUT). In such conventional OTDR systems, dead zones occur in the added optical fiber section. However, this approach typically cancels only the dead zone resulting from FUT front facet Fresnel reflection. Any other dead zones that originate by connectors or optical components and that occur along the FUT cannot be cancelled using this approach. Additionally, the added fiber section may not be available for use in testing. In contrast, FMF-based OTDR systems can cancel the dead zones along the fiber without adding any extra fibers.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, the performance of OTDR systems can rely on the number of modes. For example, in implementations in which an FMF supports propagating hundreds of modes, OTDR systems can be significantly degraded by intermodal coupling.

In some implementations, techniques of the present disclosure can be used with fiber optic sensors in downhole production wells for exploration and monitoring. For example, OTDR-based optical sensors can measure vibration, temperature, and strain along an optical fiber. Consequently, OTDR techniques can serve as an important diagnostic tool for many industrial applications, including oil and gas industry and optical communications. For example, OTDR techniques can be used obtain information associated with: 1) typical attenuation along the optical fiber because of light scattering and absorption, 2) connectors, 3) splicing points, 4) broken fiber, 5) fiber bending, and 6) fiber strain.

Figure 1:
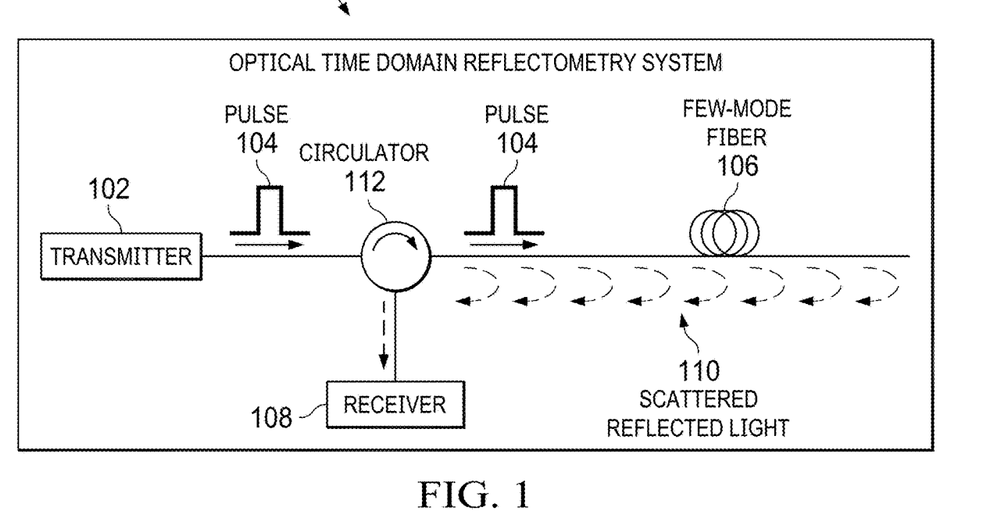
FIG. 1 is a block diagram showing an example of an optical time domain reflectometry (OTDR) system, according to some implementations of the present disclosure.

FIG. 1 is a block diagram showing an example of an OTDR system 100, according to some implementations of the present disclosure. The OTDR system 100 can be a conventional (or typical) OTDR system, for example. A transmitter 102 injects a series of optical pulses 104 into a FUT 106. A receiver 108 extracts, from the same input port, light 110 that is scattered or reflected from the FUT 106. The injected and reflected/scattered light are well-routed using either a circulator 112 (or a directional coupler). For either sensing purposes or losses calculations, the OTDR system 100 relies on detecting backscattered Rayleigh, Raman, and Brillouin signals that are present from the FUT 106. Unfortunately, the power of the backscattered light is typically much weaker than that of the injected optical pulses. For an OTDR operation to be considered reliable, optical pulses launched into the FUT 106 typically must be of significant power in order to collect backscattered light having a signal-to-noise (SNR) ratio, for example, less than a predetermined threshold. In some implementations, the power of the injected optical pulses should is typically less than the FMF's power threshold of nonlinearity.

Typical commercial OTDR systems suffer from the existence of dead zones along the FUT 106 due to intense Fresnel reflection generated by the fiber front facet, fiber end facet, connectors, and other optical components. The huge difference of power between the Fresnel reflections and the other backscattered light (Rayleigh, Raman, and Brillouin) typically results in saturating the receiver and creating a dead zone equivalent to the receiver's recovery time. In the recorded OTDR signal, the dead zone may be several hundred meters long. This can inhibit the OTDR's ability to provide reliable sensing or diagnostic data within this dead zone. This problem can be greatest, for example, in short-haul applications that include a high density of optical components, such as local area networks and sensor arrays in buildings. As a result, there is a strong motivation to overcome the dead zone hurdle in OTDR systems that are typically based on Rayleigh light. This is because the power of Raman and Brillouin light is much weaker than the power of the Rayleigh signal.

In the present disclosure, an FMF is used to overcome the dead zone limitation in typical OTDR systems. FMF can serve as a compromise between the standard single-mode fiber (SMF) and multimode fiber (MMF). However, in comparison to the SMF and MMF, an FMF has the following characteristics. First, a commercial mode multiplexer/demultiplexer (MUX/DEMUX) can be used to launch individual modes into the FMF and extract the individual modes from the FMF. Second, the threshold power of nonlinearity of the FMF is greater than the power of the SMF. Third, the MUX/DEMUX can guide a restricted number of spatial modes (for example, typically fewer than 20 modes) so as to facilitate control and management of intermodal coupling and differential mode group delays in the FMF.

Figure 2:
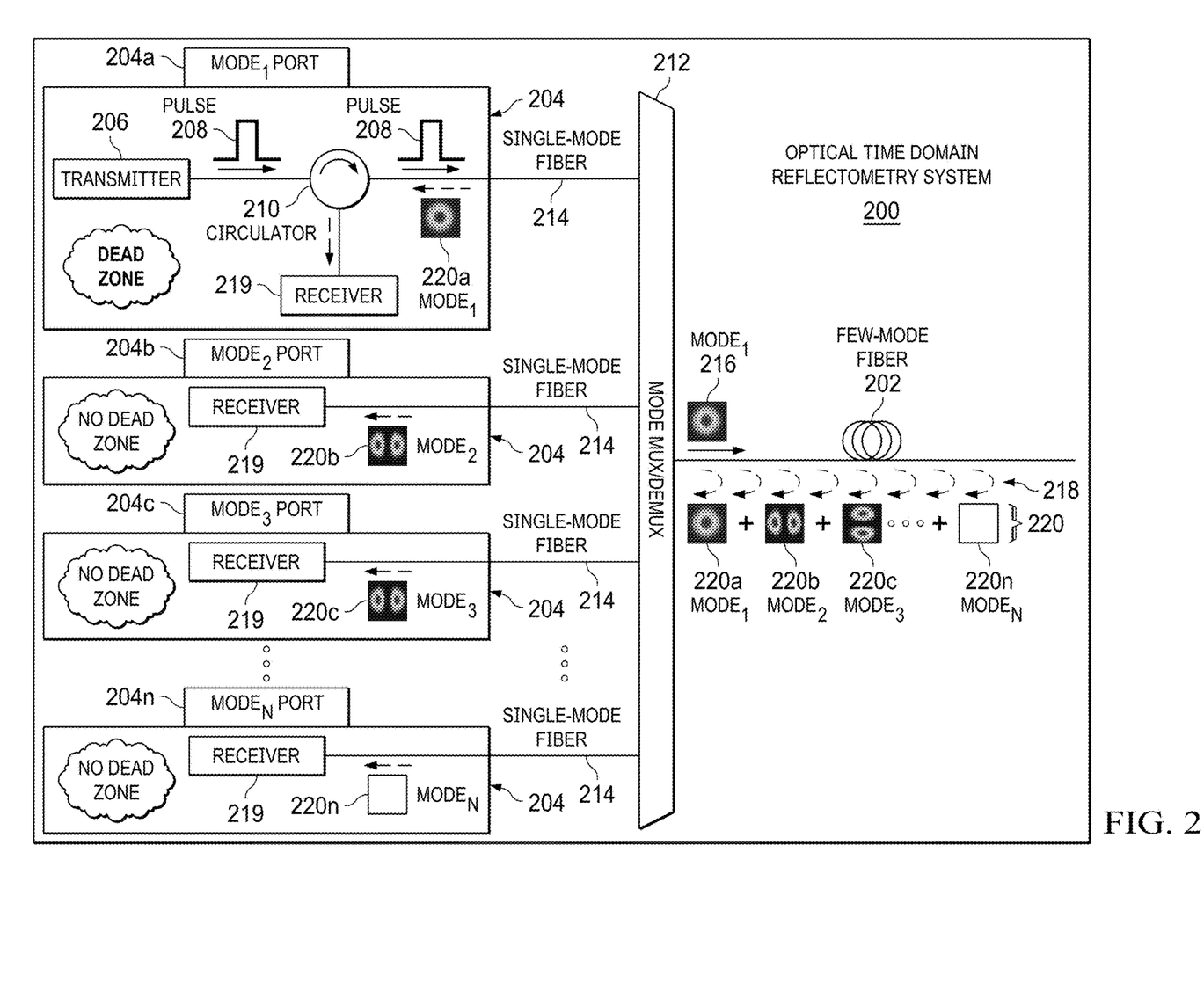
FIG. 2 is a block diagram showing an example of a few-mode fiber (FMF)-based OTDR system, according to some implementations of the present disclosure.

FIG. 2 is a block diagram showing an example of an FMF-based OTDR system 200, according to some implementations of the present disclosure. The FMF-based OTDR system 200 can overcome dead zone limitations in an FMF 202, for example. This FMF-based OTDR system 200 includes N input ports 204 1 to N (for example, including input ports 204a, 204b, 204c, and 204n), where N is the total number of spatial modes supported by the FMF 202. The input port 204a of $Mode_1$, for example, contains a transmitter 206. Optical pulses 208 generated by the transmitter 206 are injected through a circulator 210 into a mode multiplexer/demultiplexer (MUX/DEMUX) 212. SMFs 214 are employed for the entire fiber connections before launching light into the mode MUX/DEMUX 212. For example, when N SMFs are used to propagate N modes (for example, $Mode_1$, $Mode_2$, ..., $Mode_N$), the mode MUX/DEMUX 212 includes N input SMF ports and a single output FMF port. A MUX component of the MUX/DEMUX 212 delivers the optical pulses in a form of $Mode_1$ 216 to the FMF 202. As the optical pulses propagates along the FMF 202, two different kinds of light signals are directed in the backward direction 218. The light signals are received by receivers 219. The first signal type that can be produced is a Fresnel reflection which causes dead zones. This type of intense reflections can occur, for example, when the injected light encounters abrupt changes in the refractive index, such as at the fiber front-end facet and connectors. Fresnel reflections reflect back only to the incident mode, which is $Mode_1$ 220a in this example. The second type of the backward light is produced as a result of Rayleigh, Raman, and Brillouin scattering. Fortunately, these kinds of scattering excite all of the modes 220 (for example, modes 220a-220n, specifically $Mode_1$, $Mode_2$, ..., and $Mode_N$) supported by the FMF 202, in the backward direction 218. As a result, the Rayleigh, Raman, and Brillouin scattering can be used by the FMF-based OTDR system 200 for sensing and fiber losses calculations.

In the backward direction 218, both of the Fresnel reflection and scattering signals are directed towards a mode DEMUX component of the MUX/DEMUX 212. The DEMUX component can analyze the signals and separate the signals into individual mode components, as illustrated in FIG. 2. The backward signal of $Mode_1$ 220a includes both the desired light (Rayleigh, Raman, and Brillouin scattered signals) and the unwanted Fresnel reflection light. In other words, the signal collected in the backward direction by the $Mode_1$ port has dead zones. In contrast, the other backward signals of the remaining modes ($Mode_2$, $Mode_3$, ..., $Mode_N$) are all free of the Fresnel reflections and only include the Rayleigh, Raman, and Brillouin scattered light. Therefore, the backward signals of $Mode_2$, $Mode_3$, ..., $Mode_N$ are dead-zone-free and any of them or all can be used to offer reliable OTDR functionalities along the entire FMF, even within the dead zone regions of $Mode_1$. The setup shown in FIG. 1 is general and can be further simplified by collecting the light from only one port of ($Mode_2$, $Mode_3$, ..., $Mode_N$).

Figure 3:
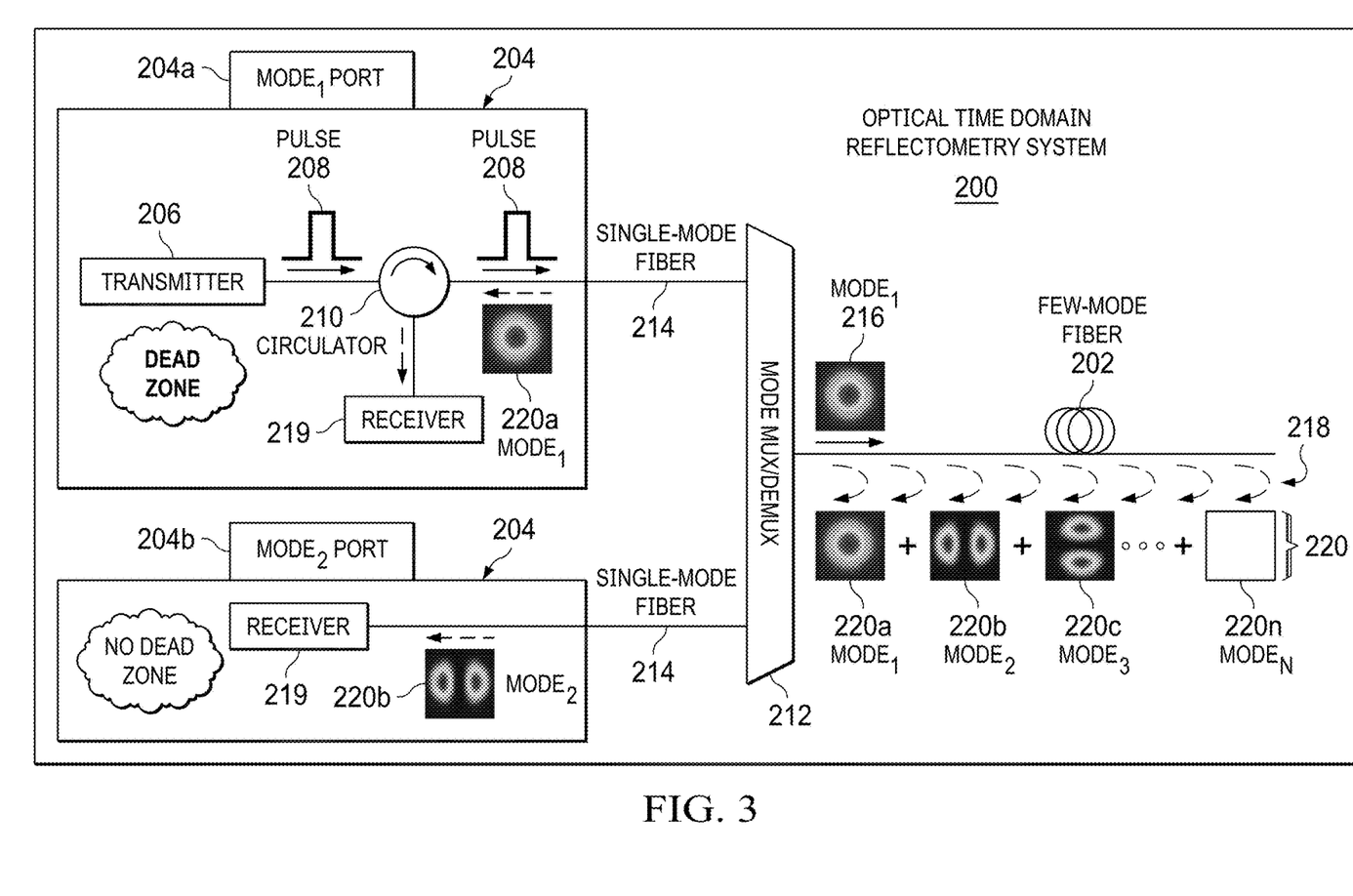
FIG. 3 is a block diagram showing another example of the FMF-based OTDR system, according to some implementations of the present disclosure.

FIG. 3 is a block diagram showing another example of the FMF-based OTDR system 200, according to some implementations of the present disclosure. As shown in FIG. 3, light is collected from the input port 204b of $Mode_2$. The backward signal collected at input port 204b for $Mode_2$ is also dead-zone-free and can offer reliable OTDR data along the entire FMF 202.

Figure 4:
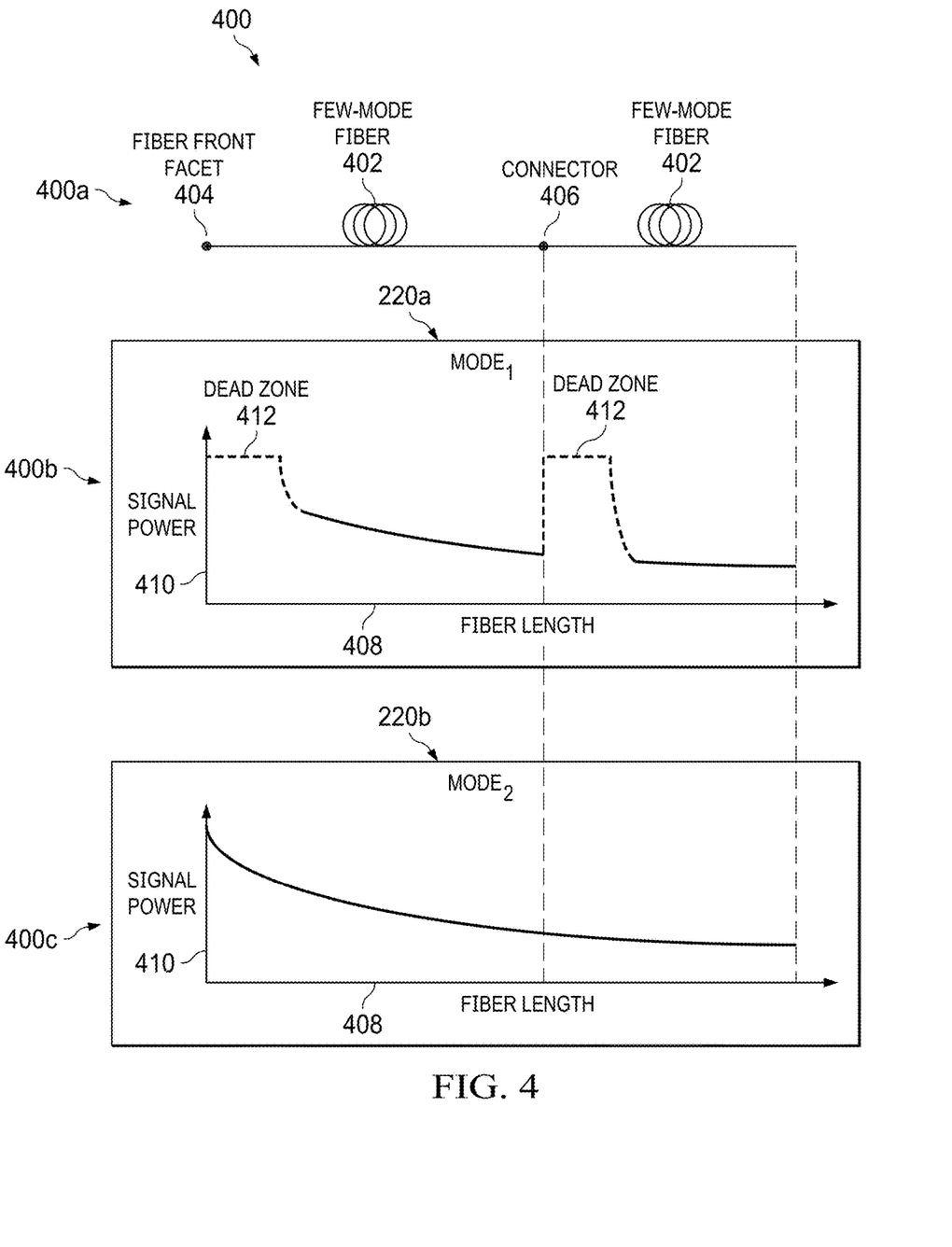
FIG. 4 is a diagram showing an example of signals collected through two ports, according to some implementations of the present disclosure.

FIG. 4 is a diagram 400 showing an example of signals collected through two ports, according to some implementations of the present disclosure. For example, the signals can be collected at input ports 204a and 204b corresponding to $Mode_1$ and $Mode_2$, respectively. An FMF 402 induces Fresnel reflections. As shown in region 400a, Fresnel reflections are induced in an FMF front facet 404 and at a connector 406 located along a fiber length 408 of the FMF. The OTDR backward signal recorded by the receivers of $Mode_1$ and $Mode_2$ port are respectively presented relative to signal power 410 in graphs 400b and 400c. The Fresnel reflections of the FMF front facet and the connector create dead zones 412 in the $Mode_1$'s OTDR signal. In contrast, the OTDR signal associated with the $Mode_2$ is dead-zone-free.

The setup shown in FIG. 2 is a representative example. As such, optical pulses can be injected into the FMF through any input mode port and backward light can be collected through any of the other remaining ports.

Figure 5:
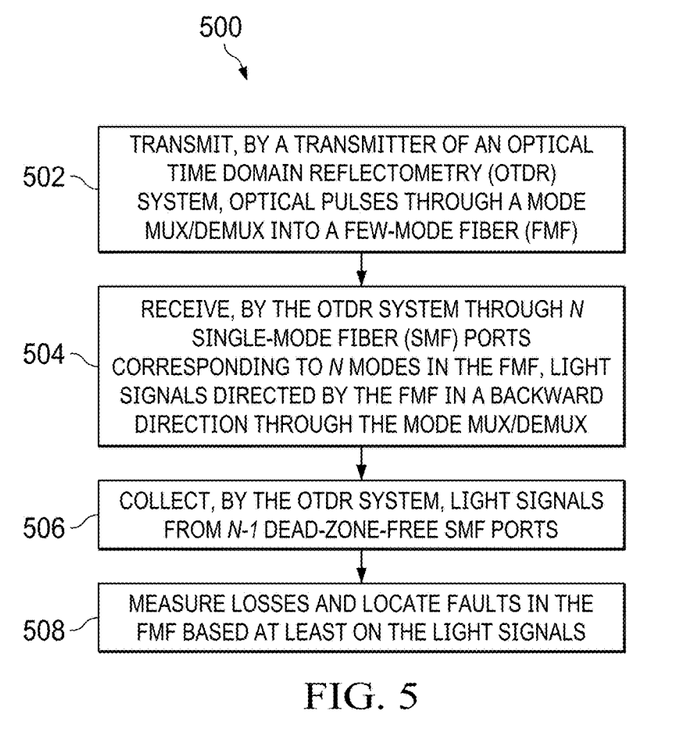
FIG. 5 is a flowchart of an example method for using FMF in an OTDR system to overcome OTDR dead zone limitations, according to some implementations of the present disclosure.

FIG. 5 is a flowchart of an example method 500 for using FMF in an OTDR system to overcome OTDR dead zone limitations, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, optical pulses are transmitted by a transmitter of an OTDR system through a mode MUX/DEMUX into an FMF. For example, the transmitter 206 can generate the optical pulses 208 that are injected through the circulator 210 into the mode MUX/DEMUX 212. From 502, method 500 proceeds to 504.

At 504, light signals directed by the FMF in a backward direction through the mode MUX/DEMUX are received by the OTDR system through N SMF ports corresponding to N modes in the FMF. As an example, the Fresnel reflection and scattering signals are directed in the backward direction 218 towards the mode DEMUX component of the MUX/DEMUX 212. From 504, method 500 proceeds to 506.

At 506, light signals from N−1 dead-zone-free SMF ports are collected by the OTDR system. For example, input ports 204b-204n corresponding to $Mode_1$ through $Mode_n$, respectively, can collect the dead-zone-free signals. From 506, method 500 proceeds to 508.

At 508, losses are measured and faults are located in the FMF based at least on the light signals. The OTDR system 200, can use the received signals to overcome dead zone limitations. After 508, method 500 can stop.

Figure 6:
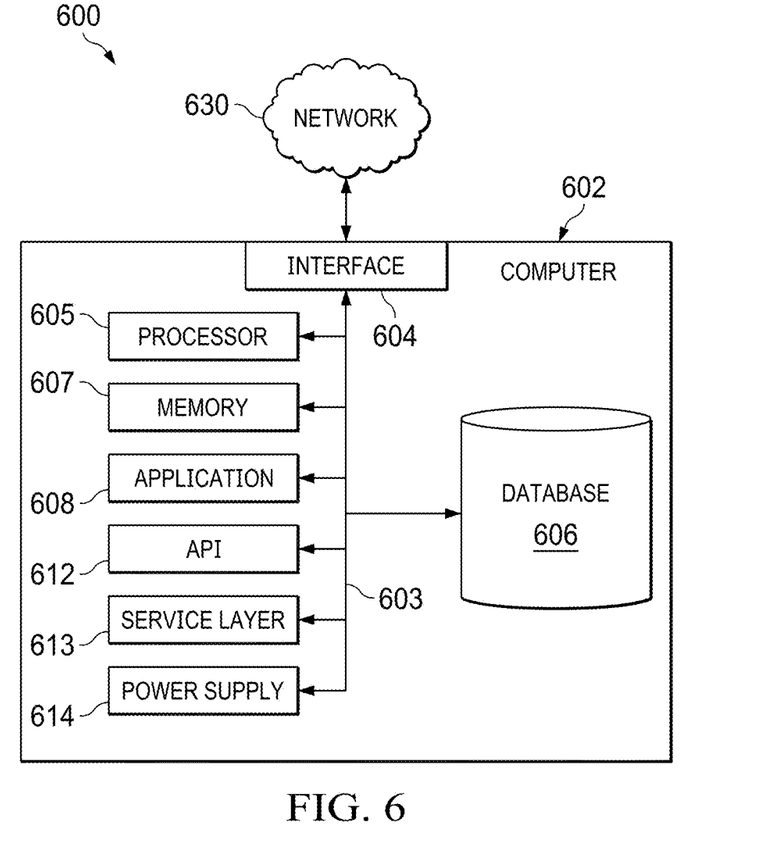
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a top level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both) over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method includes the following. Optical pulses are transmitted by a transmitter of an OTDR system through a mode MUX/DEMUX into an FMF. Light signals directed by the FMF in a backward direction through the mode MUX/DEMUX are received by the OTDR system through N single-mode fiber (SMF) ports corresponding to N modes in the FMF. Light signals from N−1 dead-zone-free SMF ports are collected by the OTDR system. Losses are measured and faults are located in the FMF based at least on the light signals.

The foregoing and other described implementations can each, optionally, include one or more of the following features:

A first feature, combinable with any of the following features, where transmitting the optical pulses through a mode MUX/DEMUX includes routing the optical pulses through a circulator.

A second feature, combinable with any of the previous or following features, where N is less than 20.

A third feature, combinable with any of the previous or following features, the method further including analyzing, by the OTDR system, the light signals received through the mode MUX/DEMUX, and separating the light signals into individual mode components.

A fourth feature, combinable with any of the previous or following features, where the light signals directed by the FMF in the backward direction include desired light, including Rayleigh, Raman, and Brillouin scattered signals, and Fresnel reflection light, and where separating the signals into the individual mode components includes separating the Fresnel reflection light into a first mode of the N modes and the Rayleigh, Raman, and Brillouin scattered signals into all N modes.

A fifth feature, combinable with any of the previous or following features, where modes 2 to N are dead-zone-free modes, and where measuring the losses and locating faults are based at least on the light signals from the dead-zone-free modes.

A sixth feature, combinable with any of the previous or following features, where measuring the losses and locating the faults are based on attenuation along optical fibers of the FMF corresponding to light scattering and absorption, connectors, splicing points, broken fiber, fiber bending, and fiber strain.

In a second implementation, a non-transitory, computer-readable medium storing one or more instructions executable by a computer system to perform operations that include the following. Optical pulses are transmitted by a transmitter of an OTDR system through a mode MUX/DEMUX into an FMF. Light signals directed by the FMF in a backward direction through the mode MUX/DEMUX are received by the OTDR system through N single-mode fiber (SMF) ports corresponding to N modes in the FMF. Light signals from N−1 dead-zone-free SMF ports are collected by the OTDR system. Losses are measured and faults are located in the FMF based at least on the light signals.

The foregoing and other described implementations can each, optionally, include one or more of the following features:

A first feature, combinable with any of the following features, where transmitting the optical pulses through a mode MUX/DEMUX includes routing the optical pulses through a circulator.

A second feature, combinable with any of the previous or following features, where Nis less than 20.

A third feature, combinable with any of the previous or following features, the operations further including analyzing, by the OTDR system, the light signals received through the mode MUX/DEMUX, and separating the light signals into individual mode components.

A fourth feature, combinable with any of the previous or following features, where the light signals directed by the FMF in the backward direction include desired light, including Rayleigh, Raman, and Brillouin scattered signals, and Fresnel reflection light, and where separating the signals into the individual mode components includes separating the Fresnel reflection light into a first mode of the N modes and the Rayleigh, Raman, and Brillouin scattered signals into all N modes.

A fifth feature, combinable with any of the previous or following features, where modes 2 to N are dead-zone-free modes, and where measuring the losses and locating faults are based at least on the light signals from the dead-zone-free modes.

A sixth feature, combinable with any of the previous or following features, where measuring the losses and locating the faults are based on attenuation along optical fibers of the FMF corresponding to light scattering and absorption, connectors, splicing points, broken fiber, fiber bending, and fiber strain.

In a third implementation, a computer-implemented system, including one or more processors and a non-transitory computer-readable storage medium coupled to the one or more processors and storing programming instructions for execution by the one or more processors, the programming instructions instructing the one or more processors to perform operations that include the following. Optical pulses are transmitted by a transmitter of an OTDR system through a mode MUX/DEMUX into an FMF. Light signals directed by the FMF in a backward direction through the mode MUX/DEMUX are received by the OTDR system through N single-mode fiber (SMF) ports corresponding to N modes in the FMF. Light signals from N−1 dead-zone-free SMF ports are collected by the OTDR system. Losses are measured and faults are located in the FMF based at least on the light signals.

The foregoing and other described implementations can each, optionally, include one or more of the following features:

A first feature, combinable with any of the following features, where transmitting the optical pulses through a mode MUX/DEMUX includes routing the optical pulses through a circulator.

A second feature, combinable with any of the previous or following features, where Nis less than 20.

A third feature, combinable with any of the previous or following features, the operations further including analyzing, by the OTDR system, the light signals received through the mode MUX/DEMUX, and separating the light signals into individual mode components.

A fourth feature, combinable with any of the previous or following features, where the light signals directed by the FMF in the backward direction include desired light, including Rayleigh, Raman, and Brillouin scattered signals, and Fresnel reflection light, and where separating the signals into the individual mode components includes separating the Fresnel reflection light into a first mode of the N modes and the Rayleigh, Raman, and Brillouin scattered signals into all N modes.

A fifth feature, combinable with any of the previous or following features, where modes 2 to N are dead-zone-free modes, and where measuring the losses and locating faults are based at least on the light signals from the dead-zone-free modes.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of UI elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A method, comprising:
    inputting, by a plurality of ports of an optical time domain reflectometry (OTDR) system and through a respective plurality of single-mode fibers (SMFs) included in the respective plurality of ports, optical pulses through a mode MUX/DEMUX of the OTDR system and into a few-mode fiber (FMF), each port corresponding to a respective mode of N modes in the FMF, each SMF of the plurality of SMFs configured to propagate a respective mode of a plurality of modes, wherein a MUX component of the MUX/DEMUX delivers the optical pulses in a form of $Mode_1$ to the FIMF;
    receiving, by the mode MUX/DEMUX of the OTDR system, light signals directed by the FMF in a backward direction through the mode MUX/DEMUX, the light signals comprising a first signal type produced by a Fresnel reflection and including dead-zones, and a second signal type produced by Rayleigh, Raman and Brillouin scattering and being dead-zone-free;
    separating, by a DEMUX component of the OTDR system, the received light signals into signals of the first signal type including the dead-zones and signals of the second signal type being dead-zone-free;
    directing, by the OTDR system, the signals of the first signal type including the dead-zones to the first port of the N SMF ports through the SMF included in the first port, and the dead-zone-free signals of the second signal type to the remaining N−1 dead-zone-free SMF ports through respective SMFs included in the respective dead-zone-free SMF ports;
    receiving, by a respective receiver included in each of the N ports, a respective light signal of a respective type, wherein the receiver that receives the signals of the first type is different from the receiver that receives the signals of the second type; and
    measuring losses and locating faults in the FIMF, by the OTDR system, based at least on the received light signals.

2. The method of claim 1, wherein transmitting the optical pulses through a mode MUX/DEMUX includes routing the optical pulses through a circulator.

3. The method of claim 1, wherein N is less than 20.

4. The method of claim 1, wherein separating the received light signals into signals of the first signal type including the dead-zones and signals of the second signal type being dead-zone-free comprises separating the Fresnel reflection into a first mode of the N modes and the Rayleigh, Raman, and Brillouin scattering into all N modes.

5. The method of claim 4, wherein modes 2 to N are dead-zone-free modes, and wherein measuring the losses and locating faults are based at least on the light signals from the dead-zone-free modes.

6. The method of claim 1, wherein measuring the losses and locating the faults are based on attenuation along optical fibers of the FMF corresponding to light scattering and absorption, connectors, splicing points, broken fiber, fiber bending, and fiber strain.

7. A non-transitory, computer-readable medium storing one or more instructions executable by a computer system to perform operations comprising:
inputting, by a plurality of ports of an optical time domain reflectometry (OTDR) system and through a respective plurality of single-mode fibers (SMFs) included in the respective plurality of ports, optical pulses through a mode MUX/DEMUX of the OTDR system and into a few-mode fiber (FMF), each port corresponding to a respective mode of N modes in the FMF, each SMF of the plurality of SMFs configured to propagate a respective mode of a plurality of modes, wherein a MUX component of the MUX/DEMUX delivers the optical pulses in a form of $Mode_1$ to the FIMF;
receiving, by the mode MUX/DEMUX of the OTDR system, light signals directed by the FMF in a backward direction through the mode MUX/DEMUX, the light signals comprising a first signal type produced by a Fresnel reflection and including dead-zones, and a second signal type produced by Rayleigh, Raman and Brillouin scattering and being dead-zone-free;
separating, by a DEMUX component of the OTDR system, the received light signals into signals of the first signal type including the dead-zones and signals of the second signal type being dead-zone-free;
directing, by the OTDR system, the signals of the first signal type including the dead-zones to the first port of the N SMF ports through the SMF included in the first port, and the dead-zone-free signals of the second signal type to the remaining N−1 dead-zone-free SMF ports through respective SMFs included in the respective dead-zone-free SMF ports;
receiving, by a respective receiver included in each of the N ports, a respective light signal of a respective type, wherein the receiver that receives the signals of the first type is different from the receiver that receives the signals of the second type; and
measuring losses and locating faults in the FMF, by the OTDR system, based at least on the received light signals.

8. The non-transitory, computer-readable medium of claim 7, wherein transmitting the optical pulses through a mode MUX/DEMUX includes routing the optical pulses through a circulator.

9. The non-transitory, computer-readable medium of claim 7, wherein N is less than 20.

10. The non-transitory, computer-readable medium of claim 7, wherein separating the received light signals into signals of the first signal type including the dead-zones and signals of the second signal type being dead-zone-free comprises separating the Fresnel reflection into a first mode of the N modes and the Rayleigh, Raman, and Brillouin scattering into all N modes.

11. The non-transitory, computer-readable medium of claim 10, wherein modes 2 to N are dead-zone-free modes, and wherein measuring the losses and locating faults are based at least on the light signals from the dead-zone-free modes.

12. The non-transitory, computer-readable medium of claim 7, wherein measuring the losses and locating the faults are based on attenuation along optical fibers of the FMF corresponding to light scattering and absorption, connectors, splicing points, broken fiber, fiber bending, and fiber strain.

13. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
inputting, by a plurality of ports of an optical time domain reflectometry (OTDR) system and through a respective plurality of single-mode fibers (SMFs) included in the respective plurality of ports, optical pulses through a mode MUX/DEMUX of the OTDR system and into a few-mode fiber (FMF), each port corresponding to a respective mode of N modes in the FMF, each SMF of the plurality of SMFs configured to propagate a respective mode of a plurality of modes, wherein a MUX component of the MUX/DEMUX delivers the optical pulses in a form of $Mode_1$ to the FIMF;
receiving, by the mode MUX/DEMUX of the OTDR system, light signals directed by the FMF in a backward direction through the mode MUX/DEMUX, the light signals comprising a first signal type produced by a Fresnel reflection and including dead-zones, and a second signal type produced by Rayleigh, Raman and Brillouin scattering and being dead-zone-free;
separating, by a DEMUX component of the OTDR system, the received light signals into signals of the first signal type including the dead-zones and signals of the second signal type being dead-zone-free;
directing, by the OTDR system, the signals of the first signal type including the dead-zones to the first port of the N SMF ports through the SMF included in the first port, and the dead-zone-free signals of the second signal type to the remaining N−1 dead-zone-free SMF ports through respective SMFs included in the respective dead-zone-free SMF ports;
receiving, by a respective receiver included in each of the N ports, a respective light signal of a respective type, wherein the receiver that receives the signals of the first type is different from the receiver that receives the signals of the second type; and
measuring losses and locating faults in the FMF, by the OTDR system, based at least on the received light signals.

14. The computer-implemented system of claim 13, wherein transmitting the optical pulses through a mode MUX/DEMUX includes routing the optical pulses through a circulator.

15. The computer-implemented system of claim 13, wherein N is less than 20.

16. The computer-implemented system of claim 13, wherein separating the received light signals into signals of the first signal type including the dead-zones and signals of the second signal type being dead-zone-free comprises separating the Fresnel reflection into a first mode of the N modes and the Rayleigh, Raman, and Brillouin scattering into all N modes.

17. The computer-implemented system of claim 16, wherein modes 2 to N are dead-zone-free modes, and wherein measuring the losses and locating faults are based at least on the light signals from the dead-zone-free modes.

* * * * *

UNITED STATES PATENT AND TRADEMARK OFFICE
CERTIFICATE OF CORRECTION

PATENT NO. : 11,624,681 B2
APPLICATION NO. : 16/744918
DATED : April 11, 2023
INVENTOR(S) : Hveding et al.

It is certified that error appears in the above-identified patent and that said Letters Patent is hereby corrected as shown below:

In the Claims

Column 14, Line 22, Claim 1, delete "FIMF" and insert -- FMF --;

Column 14, Line 46, Claim 1, delete "FIMF" and insert -- FMF --;

Column 15, Line 14, Claim 7, delete "FIMF" and insert -- FMF --;

Column 16, Line 19, Claim 13, delete "FIMF" and insert -- FMF --.

Signed and Sealed this
Twenty-third Day of May, 2023

Katherine Kelly Vidal
*Director of the United States Patent and Trademark Office*